United States Patent
Abert et al.

[19]

[11] Patent Number: 6,141,736
[45] Date of Patent: Oct. 31, 2000

[54] ARRANGEMENT WITH MASTER AND SLAVE UNITS

[75] Inventors: Michael Abert, Au; Jürgen Kühlers, Muggensturm; Albert Renschler, Ettlingen, all of Germany

[73] Assignee: Siemens Aktiengesellschaft, Munich, Germany

[21] Appl. No.: 08/836,590

[22] PCT Filed: Jun. 6, 1995

[86] PCT No.: PCT/DE95/00739

§ 371 Date: Jul. 21, 1997

§ 102(e) Date: Jul. 21, 1997

[87] PCT Pub. No.: WO96/16366

PCT Pub. Date: May 30, 1996

[30] Foreign Application Priority Data

Nov. 17, 1994 [DE] Germany ............... 44 40 789
Feb. 9, 1995 [DE] Germany ............... 195 04 136

[51] Int. Cl.[7] .................................................. G06F 12/00
[52] U.S. Cl. ......................... 711/156; 711/163; 709/227; 710/110
[58] Field of Search .................................. 711/163, 156; 395/290, 200.57; 712/31

[56] References Cited

U.S. PATENT DOCUMENTS

| | | | |
|---|---|---|---|
| 4,969,085 | 11/1990 | Desjourdy | 711/156 |
| 5,341,510 | 8/1994 | Gillett, Jr. et al. | 395/200.57 |
| 5,564,025 | 10/1996 | De Freese et al. | 395/290 |

FOREIGN PATENT DOCUMENTS

| | | |
|---|---|---|
| 44 40 789 | 5/1996 | Germany . |
| 2181281 | 10/1985 | United Kingdom . |
| 2181281 | 4/1987 | United Kingdom . |

*Primary Examiner*—Do Hyun Yoo
*Assistant Examiner*—Nasser Moazzami
*Attorney, Agent, or Firm*—Kenyon & Kenyon

[57] ABSTRACT

An arrangement in which at least one master unit is linked via a bus to a multiple of slave units, each slave unit having a memory in which the master unit carries out read and/or write accesses. The master unit can initiate a data access uniformly on each of the slave units according to a predetermined communication protocol. Moreover, a slave unit is proposed which is suitable for a communication with a master unit according to this protocol. The arrangement can be used in programmable controllers.

8 Claims, 5 Drawing Sheets

ARRANGEMENT WITH MASTER AND SLAVE UNITS

FIELD OF THE INVENTION

The present invention relates to an arrangement having at least one master unit linked via a bus to multiple slave units, each of which has a memory whose data records the master unit accesses in a reading and/or writing manner.

BACKGROUND INFORMATION

A master-slave arrangement is known from the Siemens catalogue ST 54.1, SIMATIC S5, Automatisierungsgeräte, (Programmable Controllers), 1994 edition. In a mounting rail of a highly available programmable controller, a plurality of master units in the form of central processing units are linked via a backplane bus, designed in parallel, to a plurality of slave units designed as digital input/output modules, analog input/output modules, signal preprocessing modules or as communication modules.

The master units access the slave units in a reading or writing manner and different types of data, for example process, parameterization or diagnostic data, are exchanged between the master and slave units. To that end, the slave units usually have different memory regions in which the different types of data are stored and which the master units can access with appropriate addresses. To enable trouble-free access to this data, the master units must know both the size of the memory and its division into the different memory regions, as well as the type and arrangement of the different types of data within these regions. If, for example, a master unit tries to access diagnostic data of a slave unit which does not have any diagnostic functionality, and which is therefore not provided with any diagnostic data, then, in particular in programmable controllers, no disturbances should occur, for example, in the form of an extended bus usage. To avoid such disturbances, all of the slave units connected to the bus can be provided with memories of the same size, and the division of the regions, as well as the type and arrangement of the data, can be uniformly designed. However, this means that the respective memories of the slave units must be adapted both to the largest memory and to the largest memory region of the arrangement. As a result, a few slave memories are over-dimensioned and the size of the memory regions cannot be varied.

In German Patent Application No. P 44 40 789.0, an arrangement is suggested having at least one master unit linked via a bus to a plurality of slave units, each of which has a memory and which the master unit accesses in a reading and/or writing manner. Each slave unit has a protocol region, by way of which the master unit indicates to the slave unit an imminent memory access. The respective slave unit will grant or refuse access authorization to the master unit by way of this protocol region. The slave unit, in the case of access authorization, allocates to the master unit an address region of the memory, whose position the master unit reads out from the protocol region. The address region of the slave memory therefore depends on the bus address region.

SUMMARY OF THE INVENTION

An object underlying the present invention is to specify an arrangement in which the master unit initiates a data access uniformly on each of the slave units according to a predetermined communication protocol. Moreover, a slave unit is to be provided which is suitable for a communication with a master unit according to this protocol.

All the slave units connected to the bus are provided with a protocol region which the master unit uniformly accesses in a reading or writing manner. The master unit indicates to a slave unit an intended communication with that slave unit in a request cell of the protocol region, and the slave unit acknowledges by an entry into a response cell of this protocol region. The master unit always addresses the request cells and response cells of the slave units participating in the communication under the same addresses. In the event the slave unit grants access authorization, the slave unit enters into the response cell the transfer address under which the master unit accesses one or several data records. The master unit indicates to the slave unit the end of a data transfer by means of an appropriate entry into the request cell, which the slave unit in turn acknowledges with an entry into the response cell.

All the data record accesses of the master unit take place under the same transfer address, whose bit width preferably corresponds to that of the bus. The slave unit assigns to the data records addresses for storage in the memory, which are different from the transfer address. Thus, the address region of the slave memory is independent of the bus address region, the size of the memory can be adapted to the requirements of the slave unit.

The slave unit itself manages its memory, the master unit knowing neither the memory size nor the division of the memory into the different regions. This means a "catalogue knowledge" of the memories of the slave units is not necessary for the master unit, and running times are thus shortened. The size and division of this memory is determined exclusively by the functionality of the different slave units. As a result, particularly in the case of the slave units, storage modules which are provided, for example, only with diagnostic data, or which cannot process any data records at all, and which therefore have no memory for process, parameterization and diagnostic data, are dispensed with.

The data records to be written in and read out are each provided with a data record number and, in the event of a write access, the master unit enters into the request cell the length of a data record to be written in, and in the case of a read access, the slave unit enters into the response cell the length of a data record to be read out. By means of this length information, different data records, for example 8, 16 or 32 byte data records, are supported, and slave units can be expanded by new functions which require an enlargement of the memory and the data records, without effects on the arrangement.

So that slave units which have no memory at all for such data records can participate in the communication protocol, the master unit is always refused access to data records by means of a fixed identifier in the response cell. Such slave units, for example slave units in the form of digital input/output units, are usually accessed by the master unit with a slot address and an identifier for the input or output to be operated.

The arrangement can be expanded by further slave units with different functions, provided the slave units make available this necessary protocol region, by way of which the master unit can initiate communication with the slave units.

The arrangement can comprise a plurality of master units, each provided with an identifier. A master unit carrying out a write or read access enters its identifier into the request cell, each master unit accessing a slave unit under a transfer address assigned to it.

Components of the communication protocol are a start telegram and an end telegram, the start telegram comprising the entry of the identifier for the beginning of a data record access, and the end telegram comprising the entry of the identifier for the end of a data record access. A start telegram interrupts a current data record access. In so doing, the data record number and the memory address region of the data of the data record still to be transferred are stored in a protocol memory of the slave unit. The protocol memory of the slave units is divided into regions, each master unit being allocated a region. In this manner, the correct allocation between request and response is assured both for the respective master unit and for the slave unit, and the slave units can communicate selectively with the individual master units.

The present invention is used in particular in programmable controllers.

The present invention and its refinements and advantages are explained in more detail with reference to the drawings, in which an exemplary embodiment of the present invention is illustrated.

DETAILED DESCRIPTION

Figure 1:
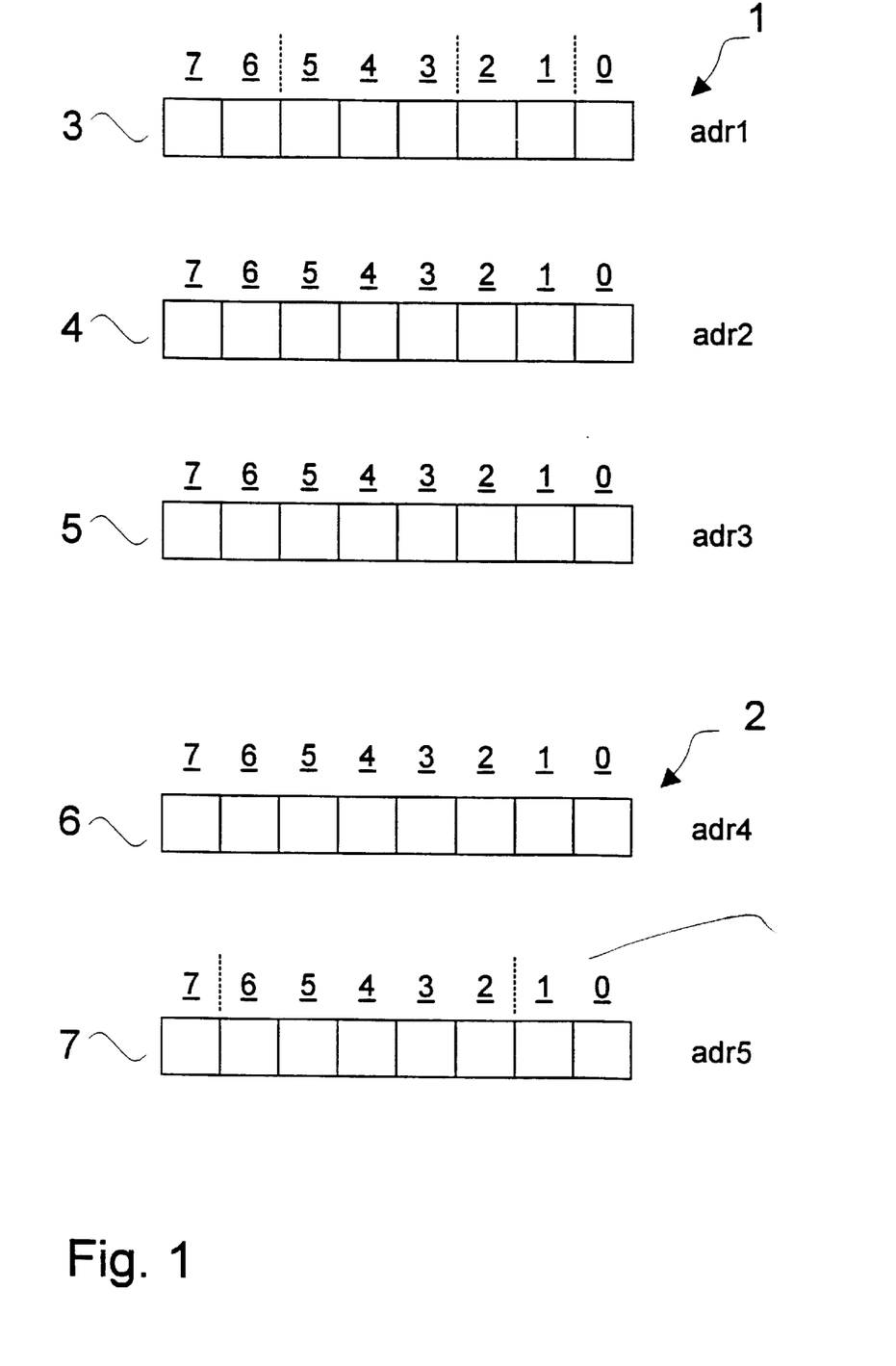
FIG. 1 shows a protocol region of a slave unit.

FIG. 1 shows a protocol memory region of a slave module, which comprises a request cell 1 and a response cell 2, request cell 1 comprising three registers 3, 4, 5, and response cell 2 comprising two registers 6, 7. Registers 3 to 7 are addressable with addressees ad1 to ad5 respectively. The master unit accessing registers 3, 4, 5 in a writing manner and registers 6, 7 in a reading manner, and the slave unit accessing registers 6, 7 in a writing manner and registers 3, 4, 5 in a reading manner. To initiate a memory access, the master unit first enters into register 3 several identifiers, and specifically, an identifier for the imminent write or read access into cell 0 of register 3, an identifier for the beginning of the access into cells 1 and 2, and an identifier for the accessing master unit into cells 6 and 7. Cells 3 to 5 are not written, but are reserved for possible functional expansions. The master unit deposits into register 4 the number of a data record which is to be entered into the memory of the slave unit, or is to be read out of it. In the case of a write access, the master unit deposits into register 5 an identifier for the length of the data record to be written in. In the event of a read access, on the other hand, the slave unit deposits into register 6 the identifier for the length of the data record to be read out. This means that, given a write access, the master unit writes registers 3, 4, 5 of the request cell, which the slave unit reads out, and that the slave unit only writes in register 7, which the master unit reads out. In the event of a read access to be initiated, on the other hand, the master unit only writes registers 3, 4, and the slave unit, in addition to register 7, writes in register 6 of the response cell 2. The slave unit indicates to the master unit, by means of an appropriate entry into cells 0 and 1 of register 7, whether the master unit is authorized to carry out a read access to the data record characterized by the data record number, or to enter this data record into the memory of the slave unit. In addition, the slave unit can indicate that this master unit cannot access the indicated data record temporarily, because the slave unit is just processing the data record, that the master unit cannot access the data record at all because, for example, the slave unit does not know the requested data record at all, or that the master unit can access the requested data record, in this case the slave unit indicating to the master unit a transfer address, under which the master unit accesses data records, in cells 2 to 6 of register 7. Cell 7 of register 7 is not occupied and can likewise be considered for possible functional expansions.

After the entries into registers 3 to 7, in the case of an existing access authorization, the master unit accesses the data stored in the memory of the slave unit under the indicated transfer address, i.e. the data transfer between the slave unit and the master unit takes place under this address. The master unit indicates the end of the access to the slave unit by means of a renewed entry of an appropriate identifier into cells 1 and 2 of register 3. The slave unit acknowledges the access end by writing the identifier provided for this purpose into cells 0 and 1 of register 7.

In a practical exemplary embodiment of the present invention, the following identifiers are provided for registers 3 to 7:
Cell 6 and 7 of register 3:
00=master unit 1
01=master unit 2
10=master unit 3
11=master unit 4
Cell 1 and 2 of register 3:
00=reserved
01=beginning of the access
10=end of the access
11=discontinuation/reset
Cell 0 of register 3:
0=writing
1=reading
Number of the data record in register 4:
0 . . . 255
Length (in bytes) of the data record in registers 5 and 6:
0 . . . 255
Cell 0 and 1 in register 7:
00=reserved
01=acknowledgment negative (temporary)
10=acknowledgment positive
11=acknowledgment negative (generally, i.e. the slave unit does not know the number of the data record)
Cell 2 to 6 in register 7:
12=transfer address 176
13=transfer address 180
14=transfer address 184
15=transfer address 188
16=transfer address 192
17=transfer address 196
18=transfer address 200
19=transfer address 204
20=transfer address 208
21=transfer address 212
Cell 3 to 5 of register 3 and cell 7 of register 7 are reserved.

Figure 2:
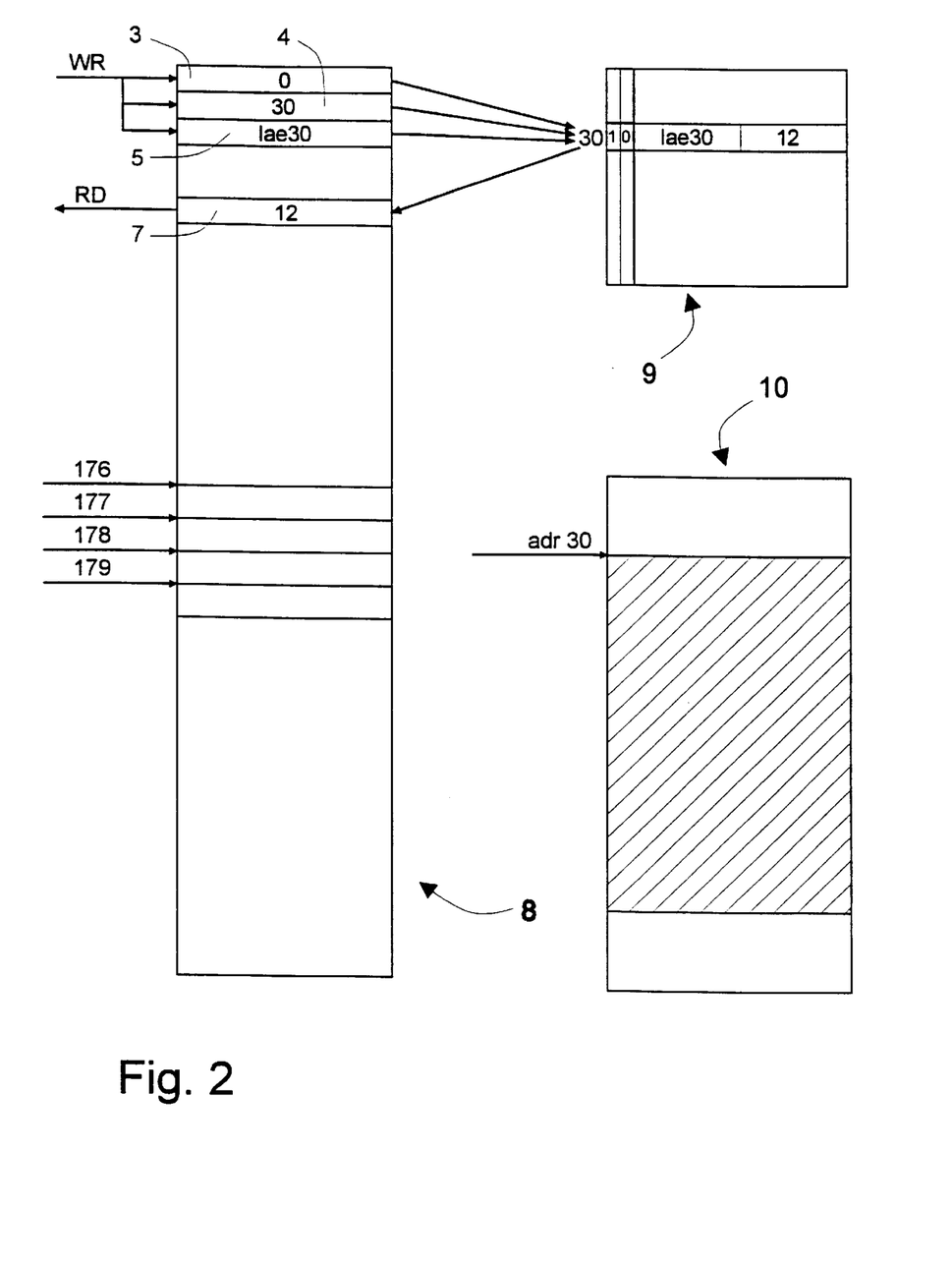
FIG. 2 shows a functional representation of a slave-unit memory management.

FIG. 2 shows a memory 10 of a slave unit, into which a user must enter parameter data for parameterization of the slave unit. The same parts occurring in FIGS. 1 and 2 are provided with the same reference symbols and, in the present example, the protocol region is a component of a protocol memory 8. For parameterization, it is necessary that the user file the parameters into a data record with the data record number 30, according to a parameterization specification provided for this unit. The master unit activates a write signal WR for writing into the protocol memory 8, and writes: into register 3 of the request cell the identifier 0 (cell 0, FIG. 1) for an intended write access, and the identifier 01 (not shown) for the beginning of the write access (cell 1 and 2, FIG. 1); into register 4 the number 30 of the parameterization data record; and into register 5, the length lae_30 of this data record. The slave unit first of all reads out the content of registers 3, 4, and with the aid of table 9 stored in the slave unit, recognizes that an authorization (identifier 10) exists for a write access to write in the parameterization data record number 30. Subsequently, the slave unit transfers the length lae_30 of the data record into the table, allocates to this data record an identifier 12 for the transfer addresses 176, 177, 178 and 179, and writes this identifier 12 into register 7 (cell 2 to 6, FIG. 1). The master unit now activates a read signal RD to read out the content of register 7 and, in a subsequent step, writes into protocol memory 8, under the transfer addresses 176 to 179, the parameterization data record of the length lae_30. The slave unit assigns an address adr-30 to this data record and stores the data record in its memory 10 under this address. Of course, it can be necessary for the master unit to have to write the protocol region of the transfer addresses 176 . . . 179 repeatedly and for the slave unit to have to read out this region repeatedly. This is the case, for example, if the data record is longer than 4 bytes and the width of the protocol memory is only 8 bits, meaning that the master unit can only read out 4 bytes during a data record access. After the master unit has transferred the data record with the data record number 30 to the slave unit by way of the transfer addresses 176 . . . 179 completely, the master unit indicates to the slave unit the end of the write access (not shown). In addition, the master unit in turn activates the write signal and enters into register 3 the identifier 10 for the end of the access. The slave unit reads out register 3 and acknowledges by entry of the identifier 11 (positive acknowledgment) into register 7 of the response cell. The write access is thus finished.

Figure 3:
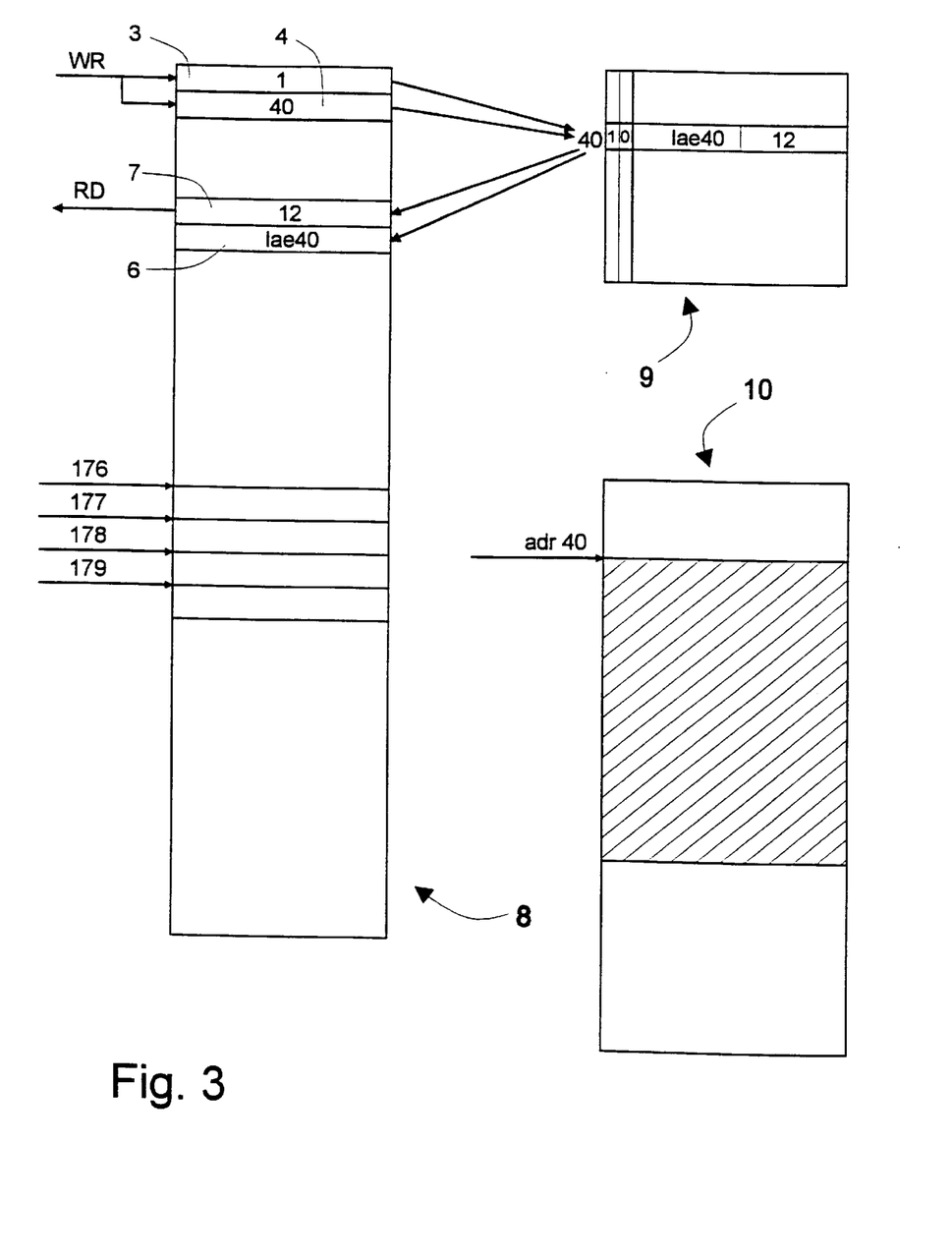
FIG. 3 shows another functional representation of a slave unit memory management.

FIG. 3 illustrates a read access to memory 10 of the slave unit. In this case, it is assumed that a data record with the number 40 is to be read out. The master unit first of all activates the write signal WR and enters into register 3 the identifier 1 for an intended read access, and the identifier 01 (not shown) for the beginning of the access, and into register 4, the number 40 of the data record to be read out. The slave unit reads out registers 3 and 4 and, because there is authorization for a read access to the data record number 40 (identifier 10 in table 9), the slave unit removes the length of the data record lae_40 and the identifier 12 for the transfer addresses 176, 177, 178 and 179 from table 9 and enters them into registers 6 and 7 of response cell 2. After activation of the read signal RD, the master unit reads out the content of registers 6 and 7 and, under the transfer addresses 176 to 179, accesses the content (data record number 40) of the protocol memory which the slave unit has read out from memory 10 under the address adr-40 and has entered under these transfer addresses into the protocol memory. For the read access, it can also be necessary for the slave unit to have to repeatedly write the protocol region with the transfer addresses 176 to 179, in dependence upon the length of the data record to be read out and the width of the protocol memory, and for the master unit to have to read out this region repeatedly in order to read out the data record completely. The master unit, in turn, indicates in register 3 the end of the read access to the slave unit, the slave unit acknowledging the indication in register 7.

Figure 4:
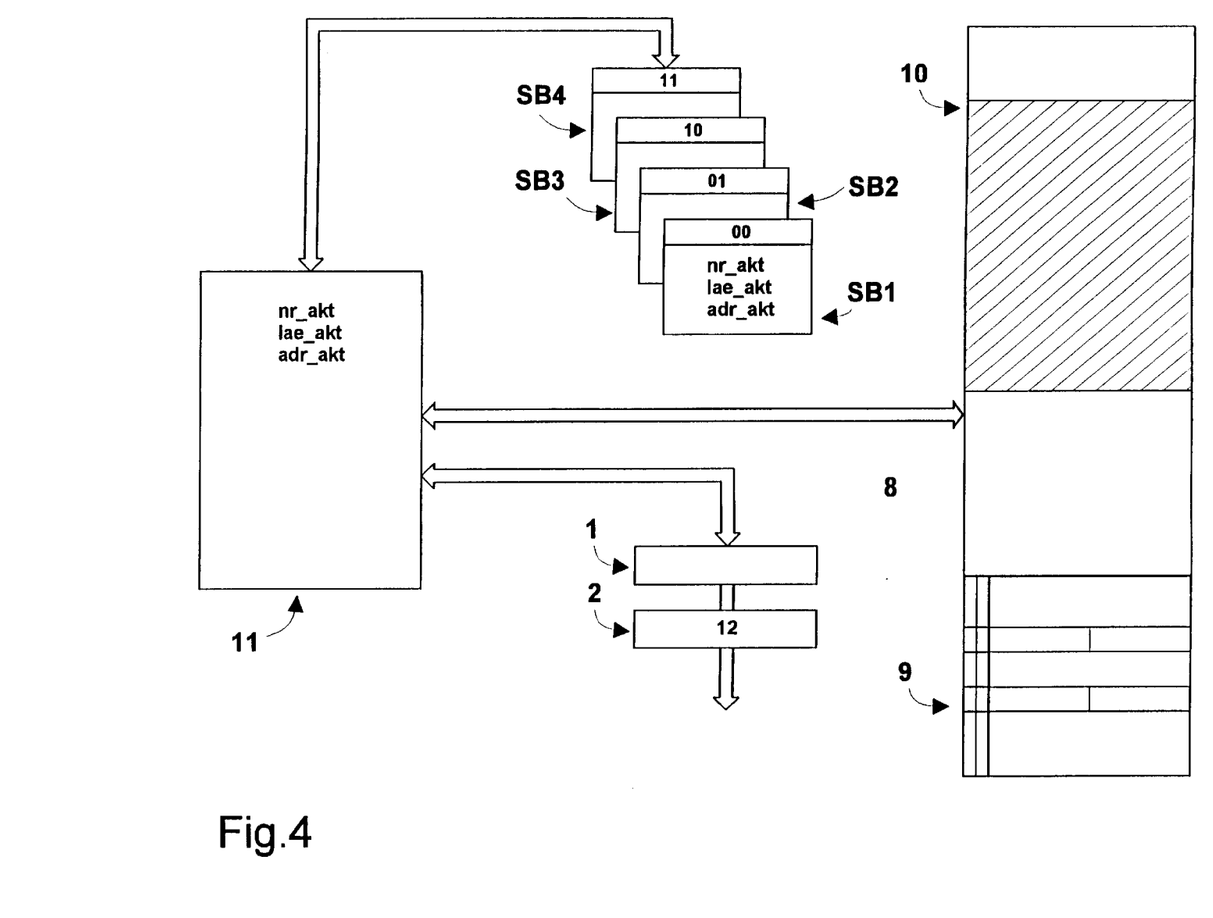
FIG. 4 shows yet another functional representation of a slave unit memory management.

In FIG. 4, protocol memory 8 is provided with four stack regions SB1, SB2, SB3, and SB4, each of which is allocated to one of four master units with the identifiers 00, 01, 10 and 11 (FIG. 1) respectively. The fact that protocol region 1, 2 and protocol memory 8, as well as control table 9 and slave memory 10 are shown separately does not signify any restriction of the generality. A division of the regions according to FIGS. 2 and 3, or another suitable division, is, of course, also conceivable.

It is first of all assumed that—as already described— master unit 1 (identifier 00), with a first start telegram which comprises the entry of the identifier for the beginning of an access and the identifier 00 for the accessing master unit, introduces the access to a data record. A protocol control 11 of the slave unit reads the start telegram out of request cell 1, examines the access authorization and, in the case of granted access authorization, writes into response cell 2 the identifier 12 for transfer addresses 176 to 179, said identifier being allocated to this master unit 1. The master unit 1 accesses the registers of the slave unit which can be addressed under these transfer addresses, and into which the slave unit writes the requested data or out of which the slave unit reads the requested data. It can now happen that, because of the requirements of a control program to be executed by master unit 1, this data-record access must be interrupted and master unit 1 must access another data record. To this end, master unit 1 writes a second start telegram into request cell 1, this having the effect that protocol control 11 first of all enters into stack memory SB1 the current data record number nr_akt of the data record whose transfer was interrupted, the data record length lae_ akt, yet to be transferred, of this data record, and the current memory address adr_akt under which the not yet transferred data is deposited in slave memory 10. After this data protection, the slave unit processes the data transfer introduced by the second start telegram. If this data transfer is concluded, which master unit 1 indicates to the slave unit by way of an end telegram, the data transmission of the interrupted data transfer is resumed again. For that purpose, it is first of all necessary that protocol control 11 initially reads in the information (the data record number nr_akt, data record length lae_akt, memory address adr_akt) deposited in the stack region SB1 in order to continue the data transfer. In turn, master unit 1 indicates to the slave unit the end of the transfer by means of an end telegram allocated to this data record.

In the following, the processing of protocols of several master units by the slave unit is considered. In so doing, it is assumed that master unit 2 enters a start telegram into request cell 1 for a write access to a data record, which master unit 1 is just accessing in a writing manner (nested write accesses). In this case, the slave unit acknowledges the access of this master unit 2 in response cell 2 in a temporarily negative manner (identifier 01, FIG. 1). Nested read accesses, i.e. read accesses of several master units to the same data record, are possible, in connection with which, for reasons of performance, the "nesting depth" should not be selected to be too high. Each master unit is allocated its own transfer address, under which the respective master unit accesses data records. To make simultaneous, nested write and read accesses to a data record possible, slave memory 10 is divided into a write and a read region. A data record, modified by a write access, is deposited by the slave unit, after this modification, into the read region, the same data record number being allocated in each case to these data records.

To achieve a deterministic behavior, all slave units must acknowledge accesses of the master unit within a certain time. In the case where several master units want to access a data record, it is necessary for the slave unit to acknowledge the intended access positively to the first accessing master unit. However, it is also necessary for the slave unit to acknowledge the access attempt temporarily negatively to all other master units.

Figure 5:
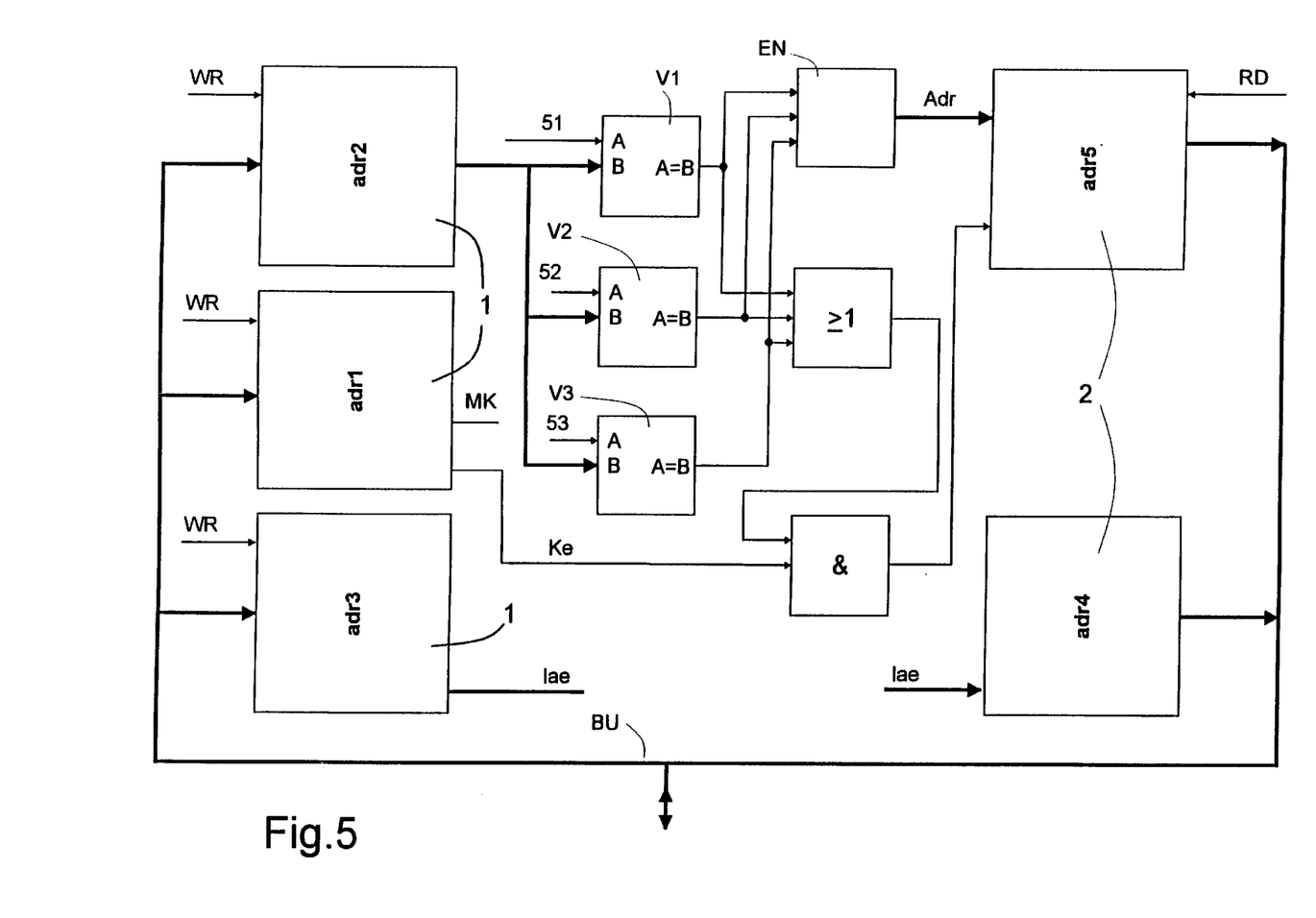
FIG. 5 shows the block diagram of an evaluation circuit of a slave unit.

FIG. 5 is a block diagram of a simple evaluation circuit of a slave unit, which is capable of evaluating three different data records provided with data record numbers 51, 52, 53. In the following, a write access is considered. During the active write signal WR, the appropriate identifiers which are to be evaluated are supplied by way of a bus BU to request cell 1. In the present example, however, an identifier MK of the accessing master unit and the data record length lae are not evaluated. Data records are applied to comparators V1, V2, V3 which examine whether the master unit is authorized to access the data records 51, 52, 53. The identifiers Ke for the beginning of the request, the end of the request or the discontinuation of the request are examined with discrete logic. An encoder EN allocates a transfer address Adr to the data records and, in the case where access to one of the data records 51, 52, 53 and the identifier Ke is permitted, a positive acknowledgment is deposited in response register 2. Given the active read signal RD, response cell 2 is read out by the master unit and the data records 51, 52, 53 are transferred between the master unit and the slave unit by way of the read-out transfer address Adr. A recognition and mutual locking of multiple requests is not possible with the simple evaluation circuit shown.

What is claimed is:

1. A master-slave unit arrangement, comprising:
   at least one master unit; and
   at least one slave unit connectable via a bus to the at least one master unit,
   wherein the at least one slave unit has a memory in which at least one data record is accessible by the at least one master unit for reading or writing,
   wherein the at least one slave unit has a protocol region for a communication protocol by which the at least one master unit indicates to the at least one slave unit an imminent memory access, and by which the at least one slave unit grants or refuses memory access to the at least one master unit,
   wherein, in the case of a memory access authorization, the at least one slave unit allocates to the at least one master unit at least one transfer address which the at least one master unit reads out from the protocol region, the at least one master unit accessing the at least one data record using the at least one transfer address,
   wherein the protocol region includes a request cell and a response cell,
   wherein the at least one master unit writes into the request cell one of a write identifier and a read identifier, with at least one of an identifier for a beginning and an end of the memory access, and in the case of a write access, with a length identifier of the at least one data record to be written in,
   wherein the at least one slave unit writes into the response cell an identifier for the access authorization, with the at least one transfer address, and in the case of a read access, with a length identifier of the at least one data record to be read out, and
   wherein the at least one data record is provided with a data record number which the at least one master unit enters into the request cell.

2. A master-slave unit arrangement comprising:
   at least one master unit; and
   at least one slave unit connectable via a bus to the at least one master unit,
   wherein the at least one slave unit has a memory in which at least one data record is accessible by the at least one master unit for reading or writing,
   wherein the at least one slave unit has a protocol region for a communication protocol by which the at least one master unit indicates to the at least one slave unit an imminent memory access, and by which the at least one slave unit grants or refuses memory access to the at least one master unit,
   wherein, in the case of a memory access authorization, the at least one slave unit allocates to the at least one master unit at least one transfer address which the at least one master unit reads out from the protocol region, the at least one master unit accessing the at least one data record using the at least one transfer address, and
   wherein the communication protocol comprises a start telegram and an end telegram, the start telegram comprising an identifier for the beginning of a data record access, and the end telegram comprising an identifier for the end of a data record access.

3. The arrangement of claim 2, wherein when the start telegram interrupts a current data record access, the at least one slave unit is provided with a protocol memory in which a data record number and a memory address region of the data, yet to be transferred, of the data record are deposited for the interrupted data record access.

4. A master-slave unit arrangement comprising:
   at least one master unit; and
   at least one slave unit connectable via a bus to the at least one master unit,
   wherein the at least one slave unit has a memory in which at least one data record is accessible by the at least one master unit for reading or writing,
   wherein the at least one slave unit has a protocol region for a communication protocol by which the at least one master unit indicates to the at least one slave unit an imminent memory access, and by which the at least one slave unit grants or refuses memory access to the at least one master unit,
   wherein, in the case of a memory access authorization, the at least one slave unit allocates to the at least one master unit at least one transfer address which the at least one master unit reads out from the protocol region, the at least one master unit accessing the at least one data record using the at least one transfer address, and
   wherein the at least one master unit is provided with an identifier which the at least one master unit, when carrying out a data record access, enters into the protocol region, and wherein different transfer addresses are provided for each of the at least one master units.

5. A master-slave unit arrangement comprising:
   at least one master unit; and
   at least one slave unit connectable via a bus to the at least one master unit,
   wherein the at least one slave unit has a memory in which at least one data record is accessible by the at least one master unit for reading or writing,
   wherein the at least one slave unit has a protocol region for a communication protocol by which the at least one master unit indicates to the at least one slave unit an imminent memory access, and by which the at least one slave unit grants or refuses memory access to the at least one master unit, wherein, in the case of a memory access authorization, the at least one slave unit allocates to the at least one master unit at least one transfer address which the at least one master unit reads out from the protocol region, the at least one master unit accessing the at least one data record using the at least one transfer address, and wherein the at least one slave unit is provided with a protocol region which comprises a response cell provided with a fixed identifier which the at least one master unit reads out and which causes the at least one slave unit to refuse one of the read and write access to the at least one master unit.

6. A slave unit linked via a bus to at least one master unit, the slave unit comprising:

a memory containing at least one data record which is accessible to the at least one master unit for reading or writing, wherein the slave unit has a protocol region which is writable for a communication protocol, and by way of which the at least one master unit indicates to the slave unit an imminent memory access, wherein, in the case of a memory access authorization, the at least one slave unit allocates to the at least one master unit at least one transfer address which the at least one master unit reads out from the protocol region, the at least one master unit accessing the at least one data record using the at least one transfer address, and wherein the at least one data record is provided with a data record number which the at least one master unit enters into a request cell.

7. A slave unit linked via a bus to at least one master unit, the slave unit comprising:

a memory containing at least one data record which is accessible to the at least one master unit for reading or writing, wherein the slave unit has a protocol region which is writable for a communication protocol, and by way of which the at least one master unit indicates to the slave unit an imminent memory access, wherein, in the case of a memory access authorization, the at least one slave unit allocates to the at least one master unit at least one transfer address which the at least one master unit reads out from the protocol region, the at least one master unit accessing the at least one data record using the at least one transfer address, and wherein the communication protocol includes a start telegram and an end telegram, the start telegram including an identifier for the beginning of a data record access, and the end telegram including an identifier for the end of a data record access.

8. The slave unit according to claim 7, wherein the start telegram interrupts a current data record access, the slave unit being provided with a protocol memory in which a data record number and a memory address region of the data, yet to be transferred, of the data record are deposited for the interrupted data record access.

* * * * *